United States Patent [19]

Minkler, II

[11] Patent Number: 4,712,174

[45] Date of Patent: Dec. 8, 1987

[54] METHOD AND APPARATUS FOR GENERATING TEXT

[75] Inventor: Jackson D. Minkler, II, Phoenix, Ariz.

[73] Assignee: Computer Poet Corporation, Sparks, Nev.

[21] Appl. No.: 603,731

[22] Filed: Apr. 24, 1984

[51] Int. Cl.$^4$ .............................................. G06F 9/06
[52] U.S. Cl. .................................. 364/200; 364/300; 364/419
[58] Field of Search ... 364/200 MS File, 900 MS File, 364/300, 419, 410, 411, 412; 434/167, 169, 308, 157, 335

[56] References Cited

U.S. PATENT DOCUMENTS

| | | | |
|---|---|---|---|
| 4,041,467 | 8/1977 | Cota et al. | 364/900 |
| 4,085,445 | 4/1978 | Bleuins et al. | 364/900 |
| 4,144,656 | 3/1979 | Podkopaev et al. | 434/157 |
| 4,305,131 | 12/1981 | Best | 364/521 |
| 4,308,017 | 12/1981 | Laughon et al. | 434/169 |
| 4,339,134 | 7/1982 | Macheel | 273/138 A |
| 4,417,322 | 11/1983 | Berry et al. | 364/900 |
| 4,559,598 | 12/1985 | Goldwasser et al. | 364/419 |

OTHER PUBLICATIONS

Liddil, Bob, "Interactive Fiction: Six Micro Stories," Byte, Sep. 1981, p. 436.
Marcus, Stephen, "Gosub: Poet: Return, Computers and the Poetic Muse", Educational Technology, Aug., 1984, pp. 15-20.
Holder, Wayne, "Software Tools for Writers", Byte, Jul., 1982, pp. 138-163.
Owens, Peter, "Creative Writing with Computers", Popular Computing, Jan., 1984, pp. 128-132.
McKean, Kevin, "Computers, Fiction, and Poetry", Byte, Jul., 1982, pp. 50-53.

Primary Examiner—Thomas M. Heckler
Assistant Examiner—Jonathan Fairbanks
Attorney, Agent, or Firm—M. David Shapiro

[57] ABSTRACT

A computer based system for generating text from a predetermined data base, in either prose or poetic form, in response to a plurality of input data provided by an operator in an interactive mode of operation with the computer. The preferred embodiment disclosed produces limerick style poetry in response to name, gender, geographic place of residence, primary and secondary traits and the number of syllables in certain input data items, and includes poetic material related to each of these data input items.

36 Claims, 6 Drawing Figures

METHOD AND APPARATUS FOR GENERATING TEXT

FIELD OF THE INVENTION

The invention relates to a computerized system for generating prose or poetry in response to an operator's input information about the recipient of such text.

BACKROUND OF THE INVENTION

It is well known in the prior art to generate textual material by combining prewritten sentences, paragraphs or sections of text retrieved from data base files. This kind of work output may be generated on an electronic typewriter or on a more complex and sophisticated word processing system. Form letters are commonly customized by inserting the recipient's name in the salutation and, sometimes, in the body of the text. Provision is frequently made to include reference in the text to the gender of the recipient to further personalize that text. Some such systems provide for identification of the profession and/or address of the recipient as well as other custom identifying characteristics within the body of the text. The word processing operator must know the content of each of the blocks of text which are available for use and must "build" a letter or other document from those stock blocks of text which are available to him or her. It is not believed that there is any such system which will generate text responsive to a menu driven query list.

It is also well known that a large industry exists to manufacture and market preprinted greeting cards which may be somewhat customized by consumer selection as to gender, occasion, family relationship and even the age of the recipient, and to some extent, to the identity of the sender(s). Many of the available greeting cards utilize poetry and some of that is in limerick form The purchaser of such a greeting card must manually search a large number of such cards on the display shelves of a retail store which deals in such products in order to make a selection which best suits his or her purposes and the intended recipient(s). The manufacturer of such greeting cards must design, manufacture and market a huge inventory of different cards in order to be competitive in the marketplace. Retail dealers must also carry a large inventory of different kinds of cards in order to be competitive and provide a full range of products. The retail purchaser may spend a significant period of time in selecting a card for his or her intended recipient. In spite of all the effort expended in providing large quantities of such cards in the marketplace, it is practically impossible for an end purchaser to find a card which fits more than a single personality trait of the intended recipient (ignoring such non-traits as occasion). The only way to provide such a detailed personal card is by commission or personal authorship. The expense associated with commissioning such work and the skill required for self authorship act against any practical fulfillment of a significant portion of the custom market potential.

SUMMARY OF THE INVENTION

These and other problems are resolved by means of the instant invention by providing for computer generation of text in response to data inputs provided by a computer operator in response to a predetermined set of computer menu driven queries. These queries may include the intended recipient's name, and the gender of that name, place of residence, one or more interests or personality traits and even customized message or occasion capability. The computer operator may apply a title of choice to the product thus generated and the system is designed to allow its use in retail mass market environments with the retail consumer acting as the computer operator.

It is therefore, an object of the invention to provide a pseudorandom computer printout of text in response to a plurality of input data items related to the intended recipient and/or sender of that text.

It is another object of the invention to provide a pseudorandom computer printout of poetry in response to a plurality of input data items related to the intended recipient and/or sender of the poetry.

It is still another object of the invention to personalize a computer generated pseudorandom text output by means of an algorithm which selects sections of text which are related to the personal identification, residence and personality traits of the intended recipient.

It is yet another object of the invention to compile pseudorandom poetry under the control of a computer, such poetry being related to identity and at least one personality trait of the intended recipient and such poetry being selected to accommodate the gender of the intended recipient and variations in the number of syllables in the name of the recipient.

It is a still further object of the invention to provide a pseudorandom computer printout of text which is related to the identity, gender, message or occasion, and at least one personality trait of an intended recipient of that text, whereupon, when a limited number of successive commands are given to the computer to produce such text, a new combination of text is produced even when the input data provided are the same.

These and other objects of the invention will become more readily appreciated upon study of the Detailed Description of the Invention, infra, together with the drawings in which:

DETAILED DESCRIPTION OF THE INVENTION

Figure 1:
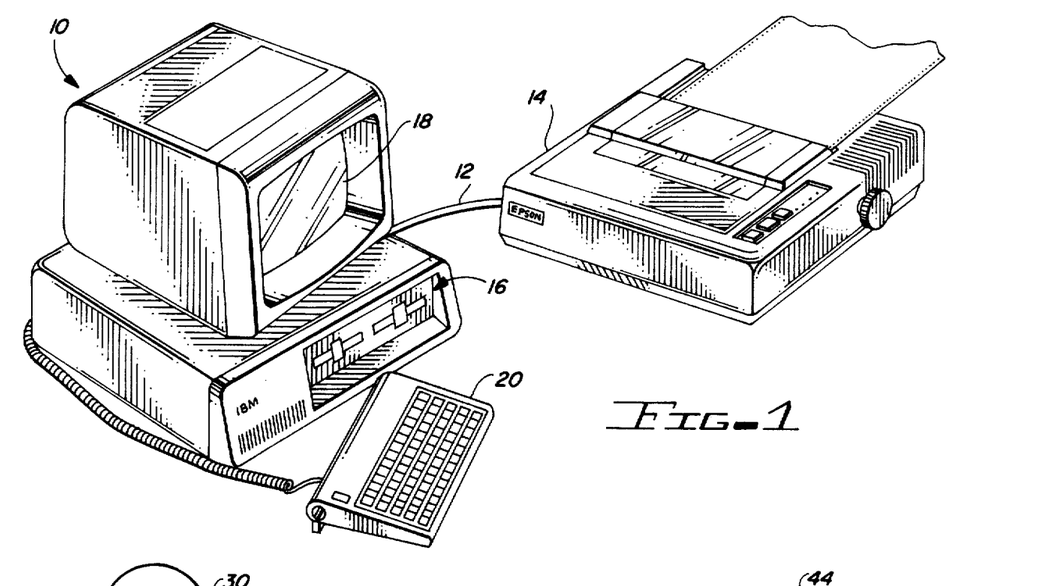
FIG. 1 is an illustration of the various physical elements of the invention.

FIG. 1 depicts the elements of the invention in pictorial form. Computer 10 may be a microcomputer such as the IBM PC personal computer, manufactured by International Business Machines, Inc., and widely available throughout the United States. Computer 10 is connected by cable 12 to printer 14 which may be an Epson MX-80 dot matrix printer which is distributed in the United States by Epson America Inc 3415 Kashiwa St. Torrance, Calif. 90505. Of course it will be understood that various other commercially available microcomputers and printers are suitable for use in such service. It will also be understood that other types of computers and printers may be used for the purposes of the invention, including, but not limited to, an automatic plotter substituted for or used in addition to printer 14, for accepting the output from computer 10. In use, a program (software) and date base is loaded into computer 10 by means of a diskette inserted into one of the disk drive slots 16 of computer 10 or by means of a resident read-only-memory (ROM) (not shown) in computer 10. Of course, as will be well understood by one having ordinary skill in this art, other media such as EPROM, $E_2$PROM, bubble memory, NOVRAM (non-volatile RAM), SRAM, magnetic tape or paper tape might also be utilized as mass storage for computer 10 in place of the floppy disk or ROM. The best embodiment of the computer program utilized in the invention is attached hereto in the Appendix which may be found in the file wrapper of the application. It is presented in BASIC language source code form and is duly inscribed with a statutory copyright notice. The owner thereof reserves all rights to the specific program and to compilations or interpretations thereof as provided for by the United States Copyright Act and various international conventions and treaties. No copies may be made thereof without the express permission of the owner except that the United States Patent and Trademark Office may copy it as necessary for the sole purpose of providing the public with complete copies of this patent (including the program), if and when this application issues.

Figure 2A:
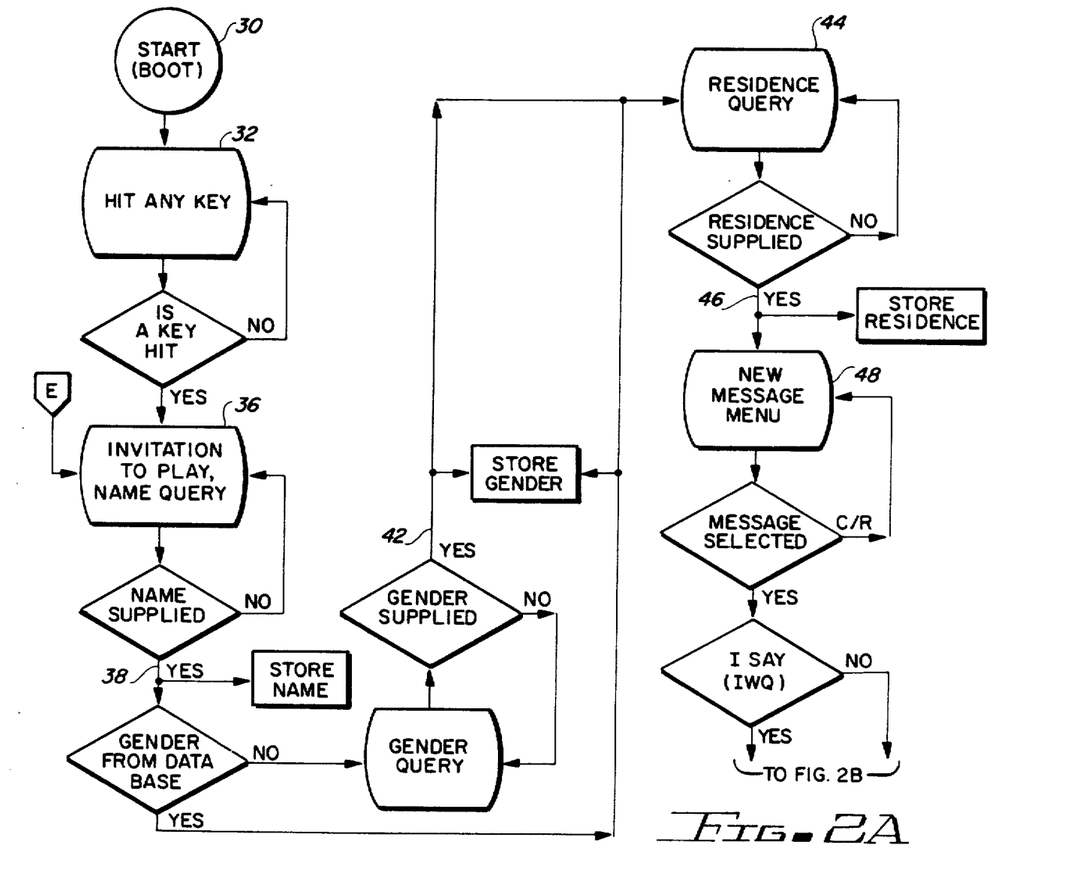
FIGS. 2A-2C is a flow chart of the steps involved in performing the preferred method of the invention.
Figure 2B:
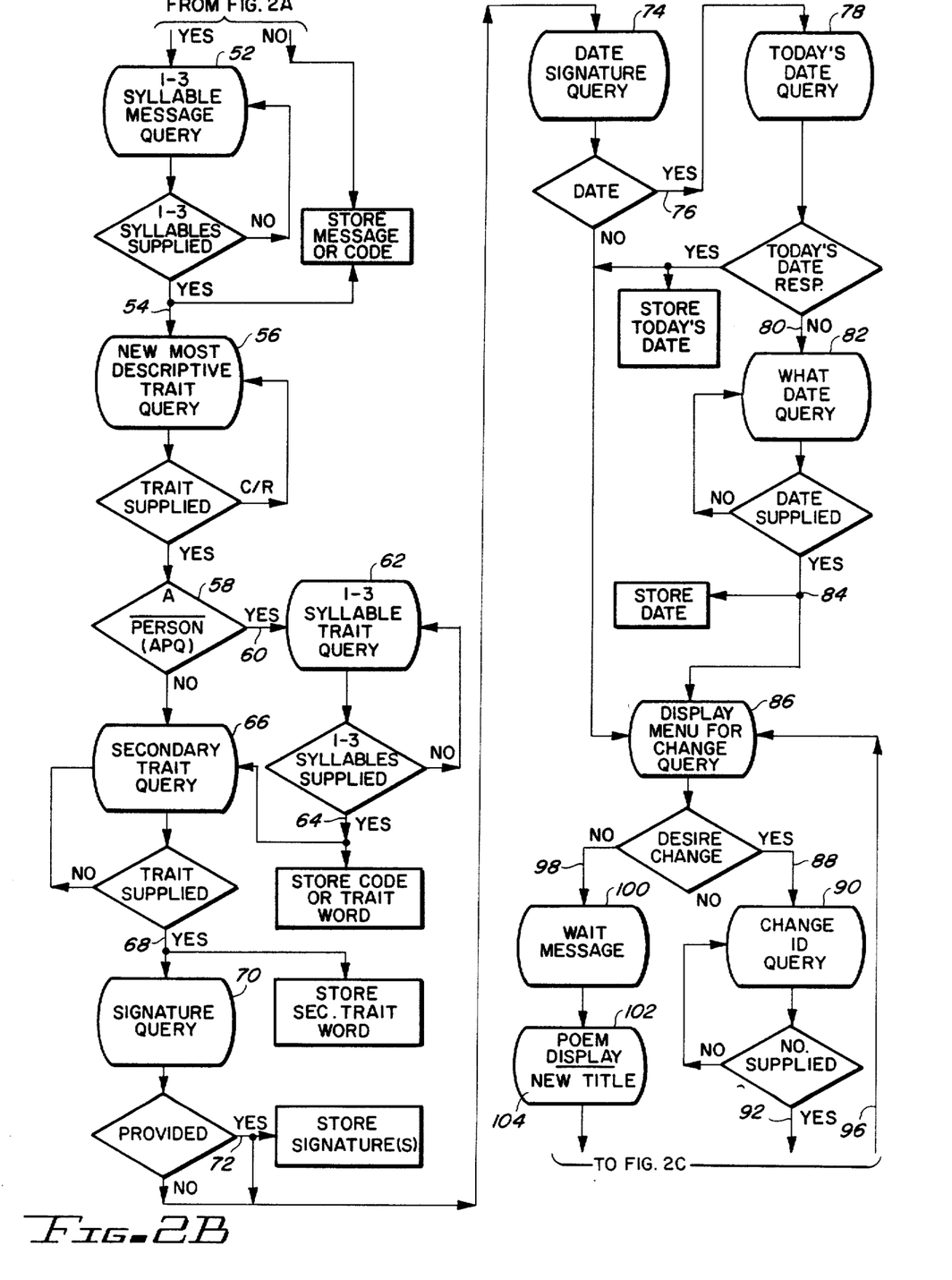
Figures 2C, 3:
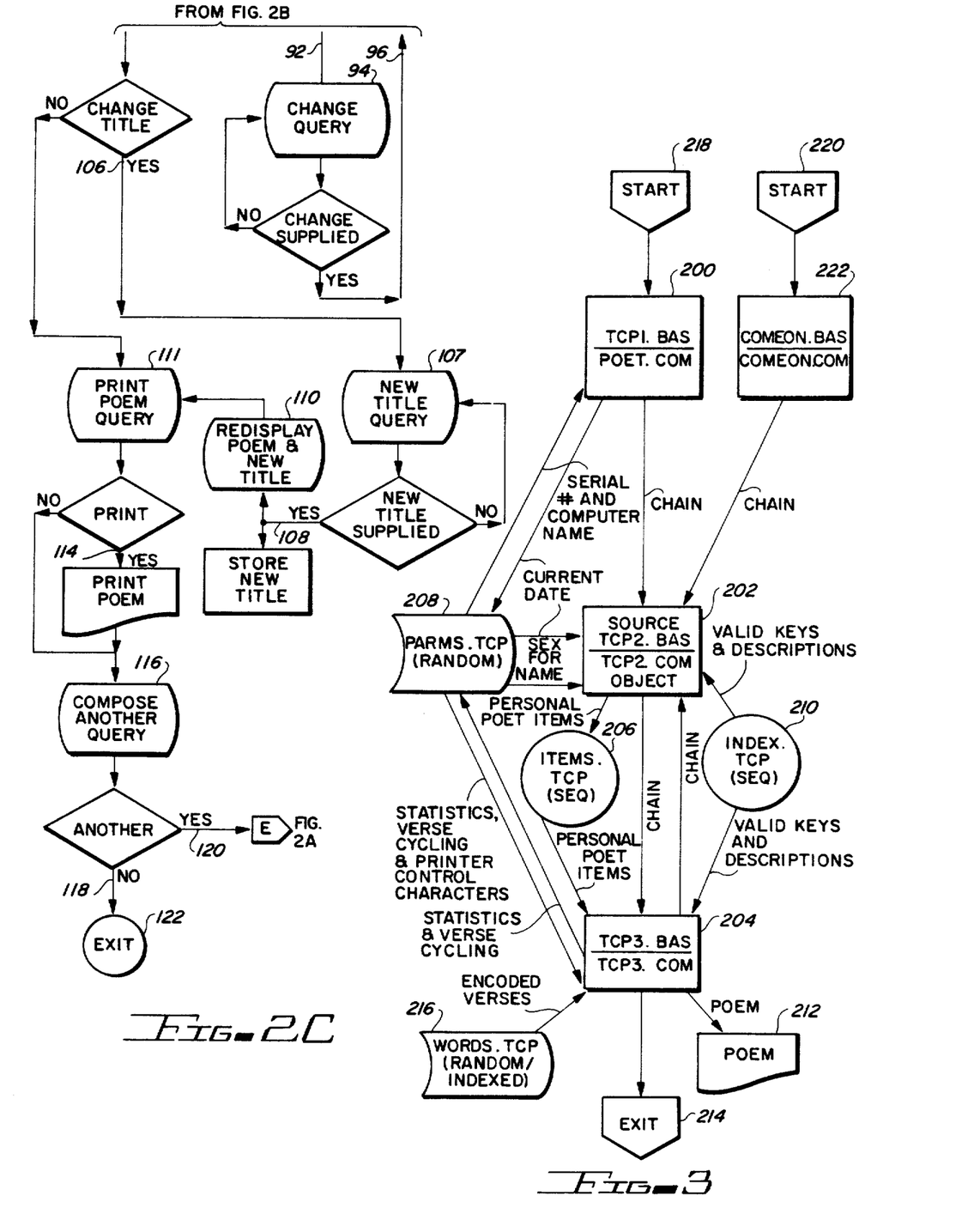
FIGS. 3 and 4 are detailed charts of the program (software) of the Appendix which is used in the implementation of the preferred embodiment of the invention.

FIG. 3 shows in block diagram form the operation of the program which is set forth in source code in the Appendix. It will be understood that FIGS. 3 and 4 do not show the necessary screen display and keyboard connections in the interest of clarity. The Appendix completely discloses this information. The main program comprises block 200, "TCP1.BAS", the source code and "POET.COM", the object code. This portion of the software displays legal notices and warnings, serial number, computer type and asks for and accepts current date. The program also comprises second block 202, "TCP2.BAS", the source code and "TCP2.COM" the object code. This portion of the software performs the queries as to the characteristics of the recipient of the poetry including name, residence, gender, message or occasion, and primary and secondary traits. It also validates and reviews the answers and passes them on to TCP3 through ITEMS.TCP, 206. ITEMS.TCP, 206 is a sequential file. Random file, PARMS.TCP, 208, supplies the serial number and computer model number to TCP1.BAS, 200; accepts the current date from TCP1.BAS, 200; supplies current date to TCP2.BAS, 202 and holds the table look-up data for determination of gender which is then provided to TCP2.BAS, 202. Sequential file INDEX.TCP, 210 provides valid key information and descriptions to TCP2.BAS, 202, and to TCP3.BAS, 204.

Program portion "TCP3.BAS", the source code and TCP3.COM, the object code, 204, composes poetry in response to the data items stored in ITEMS.TCP, 208, and WORDS.TCP, 216, displays the poetry on the computer screen display, queries the aperator as to wether a new title is desired, prints the poetry, 212, upon operator command, and either exits the program, 214, or returns to TCP2.BAS, 202, for the purpose of generating a new poem. Random file "WORDS.TCP", 216, provides the data base of verses to TCP3.BAS, 204.

The program may be started from block 218 or 220. If start is accomplished from block 220, a "come-on" or "invitation" message is displayed on the computer screen while the computer is in a standby mode waiting for an operator. When exiting 214 from a poetry generation cycle in response to an operator's request to generate another poem, start is accomplished through block 202 TCP2.BAS; otherwise it starts at block 220 and then waits for the next user, displaying a come-on message 222 in the interim. This decision as to which start to employ is a function of whether or not the operator requests another run at the end of a poetry generation cycle.

Figure 4:
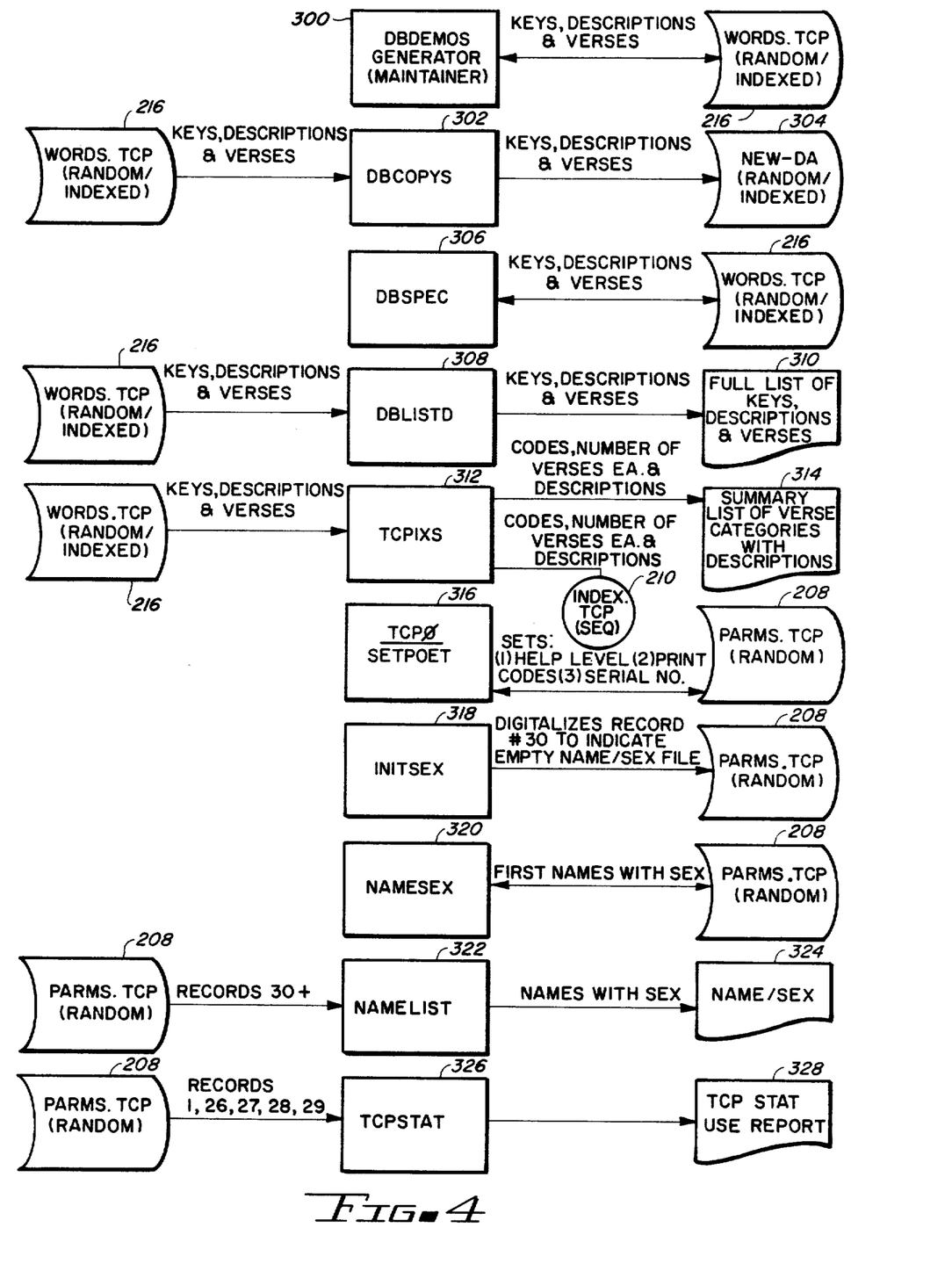

FIG. 4 is a series of block diagrams which show the various maintenance programs which are supplied within the software package. DBDEMOS 300 allows the construction of new data bases, allows changes, additions and deletions from an existing WORDS.TCP data base 216, and allows display of an existing data base. DBCOPYS 302 allows copying of an existing data base from WORDS.TCP 216 to NEW.DA 304 which is also a random file and it has the facility to skip records DBSPEC 306 is a special version of DBDEMOS 300. DBSPEC 306 allows replacement of the descriptions of the verses in WORDS.TCP 216.

DBLISTD 308 allows hard copy listing 310 of keys, descriptions and verses from WORDS.TCP 216. TCPIXS 312 may be used to create summary index files from WORDS.TCP 216 and store them in sequential INDEX.TCP 210 and list them 314 on hard copy. TCPØ, source code and SETPOET, object code, 316 may be used with random file PARMS.TCP 208 to change records 1-20. This sets the help level, the print codes and the serial number of the program INITSEX 318 may be used to initialize the name/sex records, used for finding gender. It initializes record number 30 in PARMS.TCP 208 to indicate an empty name/sex file. NAMESEX 320 is used to add new first names with associated gender to the PARMS.TCP file 208. It also updates the pointer in record number 30. NAMELIST 322 allows hard copy listing 324 of a name/sex list from PARMS.TCP 208, record number 30 and following records.

TCPSTAT 326 may be used to print statistics on the use of the program over a given period of time. Hard copy lists comprising a use report 328 are generated from information taken from random file PARMS.TCP 208. These utility programs will be more readily understood upon study of the source code software set out in the Appendix.

Generally, the program attached hereto in the Appendix, when used with the proper BASIC language compiler or interpreter (which must also be compatible with the specific computer chosen by one practicing the invention) and a suitable computer operating system (in this case, IBM Coporation DOS is used), provides the following series of interactive steps and serves to produce computer generated poetry which may be customized by the operator to suit an intended recipient of the computer generated poetry. Each step is prompted by an inquiry on cathode ray viewing screen 18, part of computer 10, and the operator may then respond with a suitable answer by means of an entry on keyboard 20. This is well known as a "menu driven" system. The query steps are listed, infra, along with typical responses by an operator:

Notes:

1. In the following description, the material in brackets, thus, "[]" is explanatory or encloses a non-printing "c/r" (carriage return) character; it is not part of the program of the preferred embodiment of the invention, and does not appear on the computer screen.

2. "/" is used to designate a line break on the screen display; it is not displayed on the screen except as a line break.

3. The numbers in parentheses to the right of each listing are keyed to the reference numerals of FIG. 2.

---

\*\*\*\*\*\*\*

THE FOLLOWING IS SEEN ON THE COMPUTER SCREEN WHEN THE PROGRAM IS
"BOOTED" IN: [when using the block 220 entry point of FIG. 3] (30)
THE COMPUTER POET/PLAY WITH ME/JUST HIT ANY KEY (32)
OPERATOR:
[Hits any key] (34)
COMPUTER SCREEN:
. . . Hold on tight; I'll count my bytes/Together soon a poem we'll write . . . (36)
The computer poet
[appears, followed by an abstract design and, again, ]
. . . the computer poet . . .
[then]
I am going to ask you some questions/about your friend or relative.
Have fun! Don't worry about mistakes./You'll have a chance to fix them later.
Together we'll compose a special poem!
1. Who is this poem about? Enter this person's first name ONLY:

______ (Hit return after entry)

OPERATOR:
[for example]
Karen [c/r] (38)
[c/r = carriage return. The typed name appears on the underlined
portion of the screen]
[The computer does a search of its name data base to see if it
knows the gender of "Karen". If not, it would proceed as follows;
if it finds the gender, it skips the next steps, reference
numerals (40), (42), and goes to (44).]
COMPUTER:
1a. Is Karen male (M) or female (F)? → (40)
OPERATOR:
F (42)
COMPUTER:
2. Where does Karen live? (name ONE only: town, state, or country): (44)

______ (Hit return after entry)

OPERATOR:
Phoenix [c/r] (46)
COMPUTER:
Pick one of these messages to Karen: (48)

| ADM: I ADMIRE YOU | ANG: ANGRY AT YOU | ANN: OUR ANNIVERSARY |
|---|---|---|
| ANY: YOUR ANNIVERSARY | BAB: BABY ON THE WAY | BAR: BARMITZVAH (M) |
| BII: BIRTHDAY INVITE | BIR: BIRTHDAY | BLA: I BLAME YOU |
| BLE: GOD BLESS YOU | BOR: I WANT IT BACK | BYE: YOU'RE MOVING |
| CEL: CELEBRATION | CHU: CHEER UP | COF: CONFIRMATION |
| COM: COMMEMORATION | CON: CONGRATULATIONS | DIF: YOU'RE SPECIAL |
| DIV: YOU'RE DIVORCED | ENG: YOU'RE ENGAGED | EST: HAPPY EASTER |
| FOO: APRIL FOOL'S | GET: GET WELL | GOL: GOOD LUCK |
| GRA: GRADUATION | HAG: HANG IN THERE | HAL: HALLOWEEN |
| HOS: THANKS TO HOST | HUR: I FEEL HURT | ILO: I LOVE YOU |
| IWQ: I SAY ______ | KAH: HAPPY HANUKKAH | MAR: WEDDING FOR MAN |
| MER: MERRY CHRISTMAS | NEB: HAPPY NEW BABY | NEW: HAPPY NEW YEAR |
| NOS: JUST HELLO | OUT: LET'S GO OUT | OWE: OWE ME MONEY |
| PAT: SAINT PATTY'S | PRM: PROMOTION | SCH: BACK TO SCHOOL |
| SHI: YOU'RE A FRIEND | SOR: I APOLOGIZE | SPE: SPECIAL EVENING |
| THA: THANKSGIVING | THY: I THANK YOU | UNB: UNBIRTHDAY |
| VAL: BE MY VALENTINE | VIS: PLEASE VISIT | WDI: WEDDING INVITE |
| WED: YOUR WEDDING | WEH: WELCOME HOME | WEL: WELCOME |

3. Enter three letters for your message to her - to see more messages, hit RETURN →
[If c/r is pressed by operator, then]
Pick one of these messages to Karen:

-continued

| | | |
|---|---|---|
| WRI: PLEASE WRITE ME | ADM: I ADMIRE YOU | ANG: ANGRY AT YOU |
| ANN: OUR ANNIVERSARY | ANY: YOUR ANNIVERSARY | BAB: BABY ON THE WAY |
| BAR: BARMITZVAH (M) | BII: BIRTHDAY INVITE | BIR: BIRTHDAY |
| BLA: I BLAME YOU | BLE: GOD BLESS YOU | BOR: I WANT IT BACK |
| BYE: YOU'RE MOVING | CEL: CELEBRATION | CHU: CHEER UP |
| COF: CONFIRMATION | COM: COMMEMORATION | CON: CONGRATULATIONS |
| DIF: YOU'RE SPECIAL | DIV: YOU'RE DIVORCED | ENG: YOUR ENGAGED |
| EST: HAPPY EASTER | FOO: APRIL FOOL'S | GET: GET WELL |
| GOL: GOOD LUCK | GRA: GRADUATION | HAG: HANG IN THERE |
| HAL: HALLOWEEN | HOS: THANKS TO HOST | HUR: I FEEL HURT |
| ILO: I LOVE YOU | IWQ: I SAY ___ | KAH: HAPPY HANUKKAH |
| MAR: WEDDING FOR MAN | MER: MERRY CHRISTMAS | NEB: HAPPY NEW BABY |
| NEW: HAPPY NEW YEAR | NOS: JUST HELLO | OUT: LET'S GO OUT |
| OWE: OWE ME MONEY | PAT: SAINT PATTY'S | PRM: PROMOTION |
| SCH: BACK TO SCHOOL | SHI: YOU'RE A FRIEND | SOR: I APOLOGIZE |
| SPE: SPECIAL EVENING | THA: THANKSGIVING | THY: I THANK YOU |
| UNB: UNBIRTHDAY | VAL: BE MY VALENTINE | VIS: PLEASE VISIT |
| WDI: WEDDING INVITE | WED: YOUR WEDDING | WEH: WELCOME HOME |

3. Enter three letters for your message to her - to see more messages, hit RETURN → (50)
[If c/r is not pressed, but a three letter message is
indicated by the operator, the display jumps to item 4, see
"descriptive traits", infra, at reference numeral (56). If the
"I SAY" choice (code "IWQ") is entered, the screen display jumps
to item (52) numbered "3a.", infra.]

OPERATOR:
IWQ

COMPUTER:
3a. Enter a one to three syllable word or phrase that will fit at the end of (52)
    'Karen, I want to tell you . . .

_______ (Hit return after entry)

OPERATOR
You're Great [c/r] [for example] (54)

COMPUTER:
Pick Karen's MOST descriptive trait: (56)

| | | |
|---|---|---|
| AMB: AMBITIOUS | APQ: A ___ PERSON | ART: ARTISTIC |
| ATH: ATHLETIC | BEA: BEAUTIFUL (F) | BOS: BOSSY |
| CAT: CAT LOVER | CHE: CHEERFUL | CHP: CHEAPSKATE |
| CLA: CLASSY | COK: GOOD COOK | COL: COLORFUL |
| COO: SO COOL | COU: COURAGEOUS | CRE: CREATIVE |
| CUD: CUDDLY | DEM: DEMOCRAT | DOG: DOG LOVER |
| DRE: WELL DRESSED | EAS: EASY GOING | ENE: ENERGETIC |
| FRI: FRIENDLY | FUN: FUNNY | GEN: GENTLE-GENEROUS |
| GOO: GOOD PERSON | HAN: HANDSOME | HAP: HAPPY |
| HEA: HEALTHY | HEL: HELPFUL | HOM: HOMEBODY |
| HON: HONEST | HUN: LOVES TO EAT | IND: INDEPENDENT |
| JOL: JOLLY | KNO: KNOWLEDGEABLE | KOM: COMPUTER LOVER |
| LAZ: LAZY | LIB: LIBERTARIAN | LOO: GOOD LOOKING |
| LOU: LOUD | LOV: LOVING PERSON | MAC: MACHO MAN |
| MAN: WELL MANNERED | MES: MESSY | NIC: NICE |
| OPI: OPINIONATED | ORG: ORGANIZED | PER: PERFECT |
| PLA: PLAYFUL | PRE: PRETTY | PRO: PRODUCTIVE |
| QUI: QUIET | REP: REPUBLICAN | RIC: RICH |

4. Enter three letters for her MOST descriptive trait - to see MORE traits, hit RETURN →
[If c/r is pressed the screen displays the next block of menu choices:
see "descriptive traits", immediately infra. If a three letter
code from the menu list is entered, the screen display jumps to
item numbered "5.", infra, except that if the "APQ" code for "A
___ PERSON" is chosen, the screen displays item numbered
"4.a.", infra.]

Pick Karen's MOST descriptive trait: (56)

| | | |
|---|---|---|
| SEI: SERIOUS | SER: SERENE | SEX: SEXY |
| SHY: SHY | SIL: SILLY | SLE: SLEEPY |
| SMA: BRIGHT & SMART | SPO: SPOILED | STU: STUFFY |
| SUA: SUAVE | SWE: SWEET | TAL: TALKATIVE |
| UNI: UNIQUE | UNP: UNPREDICTABLE | VIB: VIBRANT |
| WEI: WEIRD | WHO: WHOLESOME | AMB: AMBITIOUS |
| APQ: A ___ PERSON | ART: ARTISTIC | ATH: ATHLETIC |
| BEA: BEAUTIFUL (F) | BOS: BOSSY | CAT: CAT LOVER |
| CHE: CHEERFUL | CHP: CHEAPSKATE | CLA: CLASSY |
| COK: GOOD COOK | COL: COLORFUL | COO: SO COOL |
| COU: COURAGEOUS | CRE: CREATIVE | CUD: CUDDLY |
| DEM: DEMOCRAT | DOG: DOG LOVER | DRE: WELL DRESSED |
| EAS: EASY GOING | ENE: ENERGETIC | FRI: FRIENDLY |
| FUN: FUNNY | GEN: GENTLE-GENEROUS | GOO: GOOD PERSON |
| HAN: HANDSOME | HAP: HAPPY | HEA: HEALTHY |
| HEL: HELPFUL | HOM: HOMEBODY | HON: HONEST |
| HUN: LOVES TO EAT | IND: INDEPENDENT | JOL: JOLLY |
| KNO: KNOWLEDGEABLE | KOM: COMPUTER LOVER | LAZ: LAZY |

4. Enter three letters for her MOST descriptive trait - to see MORE traits, hit return →
OPERATOR:

-continued

| APQ | (58, 60) |
|---|---|

4a. Enter the one to three syllable adjective that BEST describes Karen:

———— (Hit return after entry) (62)

OPERATOR:
wild [c/r] (64)
COMPUTER:
Now select her SECONDARY trait: (66)

| AMB: AMBITIOUS | ART: ARTISTIC | ATH: ATHLETIC |
|---|---|---|
| BEA: BEAUTIFUL (F) | BOS: BOSSY | CAT: CAT LOVER |
| CHE: CHEERFUL | CHP: CHEAPSKATE | CLA: CLASSY |
| COK: GOOD COOK | COL: COLORFUL | COO: SO COOL |
| COU: COURAGEOUS | CRE: CREATIVE | CUD: CUDDLY |
| DEM: DEMOCRAT | DOG: DOG LOVER | DRE: WELL DRESSED |
| EAS: EASY GOING | ENE: ENERGETIC | FRI: FRIENDLY |
| FUN: FUNNY | GEN: GENTLE-GENEROUS | GOO: GOOD PERSON |
| HAN: HANDSOME | HAP: HAPPY | HEA: HEALTHY |
| HEL: HELPFUL | HOM: HOMEBODY | HON: HONEST |
| HUN: LOVES TO EAT | IND: INDEPENDENT | JOL: JOLLY |
| KNO: KNOWLEDGEABLE | KOM: COMPUTER LOVER | LAZ: LAZY |
| LIB: LIBERTARIAN | LOO: GOOD LOOKING | LOU: LOUD |
| LOV: LOVING PERSON | MAC: MACHO MAN | MAN: WELL MANNERED |
| MES: MESSY | NIC: NICE | OPI: OPINIONATED |
| ORG: ORGANIZED | PER: PERFECT | PLA: PLAYFUL |
| PRE: PRETTY | PRO: PRODUCTIVE | QUI: QUIET |
| REP: REPUBLICAN | RIC: RICH | SEI: SERIOUS |

5. Enter three letters for Karen's SECONDARY trait - to see MORE traits, hit RETURN →
[If c/r is not pressed, but a three letter trait is indicated by
the operator, the screen displays the item numbered "6.", infra.
If c/r is entered another block of secondary traits is displayed.]
OPERATOR:
LAZ (68)
COMPUTER:
6. Do you want Karen to know who this poem is from?
   If yes, enter your name, otherwise, hit RETURN ———— (Hit return after entry) (70)

OPERATOR:
Dwight And Louise [c/r] (72)
COMPUTER:
7. Do you want a date at the bottom of your poem? (Y or N) → (74)
[If operator enters "N", program jumps to display menu for change, (86).]
OPERATOR:
Y [for example] (76)
COMPUTER:
7a. Do you want TODAY'S DATE at the bottom of your poem? (Y or N) → (78)
[If operator enters "Y", program jumps to display menu for change, (86).]
OPERATOR:
N [for example] (80)
COMPUTER:
7b. Enter your date as you would like it to appear:

———— (Hit return after entry) (82)

OPERATOR:
Halloween [c/r] (84)
COMPUTER:
... Just a moment, please
While I check our Q's and P's ... (86)
1.  NAME → Karen
2.  LIVES IN → Phoenix
3.  MESSAGE → I SAY ————
3a. I SAY TO YOU → You're Great
4.  FIRST TRAIT → A ———— PERSON
4a. SHE IS → wild
5.  SECOND TRAIT → LAZY
6.  FROM NAME → Dwight And Louise
7.  DATE → Halloween
8.  SEX → Female
Do you want to change anything? (Y or N) →
OPERATOR:
Y [for example] (88)
COMPUTER:
Enter the number you want to change (1-8) → (90)
OPERATOR:
3 [for example] (92)
COMPUTER:
Pick one of these messages to Karen: (94)
[But, note that the inquiry algorithm is like the one at reference
numerals (48)-(54). The same routine is used.]

-continued

| | | |
|---|---|---|
| ADM: I ADMIRE YOU | ANG: ANGRY AT YOU | ANN: OUR ANNIVERSARY |
| ANY: YOUR ANNIVERSARY | BAB: BABY ON THE WAY | BAR: BARMITZVAH (M) |
| BII: BIRTHDAY INVITE | BIR: BIRTHDAY | BLA: I BLAME YOU |
| BLE: GOD BLESS YOU | BOR: I WANT IT BACK | BYE: YOU'RE MOVING |
| CEL: CELEBRATION | CHU: CHEER UP | COF: CONFIRMATION |
| COM: COMMEMORATION | CON: CONGRATULATIONS | DIF: YOU'RE SPECIAL |
| DIV: YOU'RE DIVORCED | ENG: YOU'RE ENGAGED | EST: HAPPY EASTER |
| FOO: APRIL FOOL'S | GET: GET WELL | GOL: GOOD LUCK |
| GRA: GRADUATION | HAG: HANG IN THERE | HAL: HALLOWEEN |
| HOS: THANKS TO HOST | HUR: I FEEL HURT | ILO: I LOVE YOU |
| IWQ: I SAY ______ | KAH: HAPPY HANUKKAH | MAR: WEDDING FOR MAN |
| MER: MERRY CHRISTMAS | NEB: HAPPY NEW BABY | NEW: HAPPY NEW YEAR |
| NOS: JUST HELLO | OUT: LET'S GO OUT | OWE: OWE ME MONEY |
| PAT: SAINT PATTY'S | PRM: PROMOTION | SCH: BACK TO SCHOOL |
| SHI: YOU'RE A FRIEND | SOR: I APOLOGIZE | SPE: SPECIAL EVENING |
| THA: THANKSGIVING | THY: I THANK YOU | UNB: UNBIRTHDAY |
| VAL: BE MY VALENTINE | VIS: PLEASE VISIT | WDI: WEDDING INVITE |
| WED: YOUR WEDDING | WEH: WELCOME HOME | WEL: WELCOME |

3. Enter three letters for your message to her -
to see MORE messages, hit return →
[see note under item numbered three, supra]
OPERATOR:
WEH [for example] (96)
COMPUTER:
... Just a moment please
while I check our Q's and P's ... (86)
1. NAME → Karen
2. LIVES IN → Phoenix
3. MESSAGE → WELCOME HOME
4. FIRST TRAIT → A ______ PERSON
4a. SHE IS → wild
5. SECOND TRAIT → LAZY
6. FROM NAME → Dwight And Louise
7. DATE → Halloween
8. SEX → Female
Do you want to change anything? (Y or N) →
OPERATOR:
Y (88)
COMPUTER:
Enter the number you want to change (1-8) → (90)
OPERATOR:
7 (92)
COMPUTER:
7. Do you want a date at the bottom of your poem? (Y or N) → (94)
[But, note that the inquiry algorithm is like the one at reference
numerals (74)-(84). The same routine is used.]
OPERATOR:
Y [for example] (76)
COMPUTER:
7a. Do you want TODAY'S DATE at the bottom of your poem? (Y or N) → (78)
OPERATOR:
Y
[Note that the inquiry algorithm is like the one at reference
numerals 74-84. The same routine is used.]
COMPUTER:
... Just a moment, please
while I check our Q's and P's ...
1. NAME → Karen (86)
2. LIVES IN → Phoenix
3. MESSAGE → WELCOME HOME
4. FIRST TRAIT → A ______ PERSON
4a. SHE IS → wild
5. SECOND TRAIT → LAZY
6. FROM NAME → Dwight And Louise
7. DATE → Wednesday, March 21st, 1984
8. SEX → Female
Do you want to CHANGE anything? (Y or N) →
OPERATOR:
N (98)
COMPUTER:
... Hold on tight; I'll count my bytes
Together soon, a poem we'll write ... (100)
[pause]
... for Karen we'll create a greeting
a greeting that she'll be repeating! ...
[pause]
... I'm not shirking; I am working!
You'll soon see; I'm right on key ... (102)
TO KAREN
In Phoenix I know of someone
That's where Karen lives and has fun
Just loafing and lazy

```
She's so lackadaisy
So listen and look for a pun
So wild she is, that's for sure
In this she is no amateur
You know I don't lie
I swear on the sky
She's wild and you won't find a cure
Been waiting to say welcome home
To you who decided to roam
So glad that you're back
I won't feel your lack
Great greetings to you in this poem
from Dwight and Louise
- the computer poet -
Wednesday, March 21st, 1984
Do you want a NEW TITLE for this poem? (Y or N) →        (104)
OPERATOR:
Y                                                          (106)
COMPUTER:

→______ (Hit RETURN after title)                          (107)

OPERATOR:
WITH LOVE, TO KAREN [c/r]                                  (108)
COMPUTER:
WITH LOVE, TO KAREN                                        (110)
In Phoenix I know of someone
That's where Karen lives and has fun
Just loafing and lazy
She's so lackadaisy
So listen and look for a pun
So wild she is, that's for sure
In this she is no amateur
You know I don't lie
I swear on the sky
She's wild and you won't find a cure
Been waiting to say welcome home
To you who decided to roam
So glad that you're back
I won't feel your lack
Great greetings to you in this poem
from Dwight and Louise
- the computer poet -
Wednesday, March 21st, 1984
To print your card just ENTER 'Y' or ENTER 'N' and it will die →   (111)
OPERATOR:
N                                                          (112)
[If the operator had entered 'Y', the poem would have been
outputted to printer 14. See FIG. 1. Then the following would
have been displayed:]                                      (114)
COMPUTER:
To compose one more ENTER 'Y' or enter 'N' to say goodbye →  (116)
OPERATOR:
N                                                          (118)
[If the operator had entered 'Y', the program would have recycled
back to the beginning at reference numeral (36).]          (120)
COMPUTER:
So sorry to hear that you're going                         (122)
Our verses have really been flowing
Come play again soon
We'll play a new tune
Whenever a card you are owing
A>
["A>" is a IBM Corporation DOS operating system prompt.]
*****
```

The foregoing is a flow chart which illustrates a typical use of the system of the invention. The flow chart is neither an all inclusive description of the program or of the use of the system, although it comes closer to the latter. It should be seen to serve as a hybrid chart of both for the purpose of lending clarification to both the program and its use.

The system of the invention is so arranged as to provide a different (pseudorandom) output poem where an identical input data set is utilized on successive runs of the program. This makes it possible for the operator to make more than one run with identical input sets and get different output poetry. The operator is then in a position to select a particular output which pleases him or her. (It is contemplated that the data base of verses will be expanded as a part of future development of the software in order to provide still more flexibility and variety in this regard.) To illustrate this point, two more poems, each derived from identical input data sets as used to generate the poem listed, supra, are set forth here:

```
TO KAREN
I heard about Karen today
In Phoenix you'll find her at play
So lazy and slow
With energy low
I'll tell you some more if I may
Been waiting to tell you all day
How wild that she is every way
It's her way of being
That you will be seeing
She's wild, so what more can I say?
Been waiting to say welcome home
To you who decided to roam
So glad that you're back
I won't feel your lack
Great greetings to you in this poem
from Dwight and Louise
- the computer poet -
Wednesday, March 21st, 1984

TO KAREN
Many things about Karen I know
Like she lives right in Phoenix - that's so
Just loafing and lazy
She's so lackadaisy
I know a lot more - see below
You know that she's the wild kind
Just watch her and this you will find
Computers tell truth
They're never uncouth
She's wild I want to remind
Been waiting to say welcome home
To you who decided to roam
So glad that you're back
I won't feel your lack
Great greetings to you in this poem
from Dwight and Louise
- the computer poet -
Wednesday, March 21st, 1984
```

(It may be noted that the last verse of all three poetry outputs are identical. The "WEH" code selection presently provides only one verse. But see, "Anticipated Enhancements", infra.)

The following explanation of the structure of the poetic output of the system will be useful to a total understanding ing of the system:

The first verse comprises two parts. The first part which comprises a first, second and fifth line is characterized as an "introductory" portion. The third and fourth lines are characterized as a "secondary trait" portion. The introductory lines (1,2 and 5) are controlled by and include the name and residence information supplied by the operator. The gender associated with the inputted name may be obtained by table look-up or by query of the operator, depending upon whether or not that name is present in the data base. The secondary trait lines (3 and 4) of the first verse are lifted from lines three and four of a five line "trait" verse stored in the data base. These lines comprise the secondary trait which is chosen and entered by the operator as part of the input data routine.

The second verse is characterized as a "trait" verse. It is controlled by and generated from the primary trait code chosen by the operator during the input routine. All five lines come straight from the data base as a group. Note that the third and fourth lines of the first verse come from this same data base of trait verses.

The third verse is characterized as a "message" or "occasion" verse. It is controlled by and generated from the message or occasion code provided by the operator during the input routine. All five lines come from the data base as a group It will be understood that the data base is further divided within each characteristic division to provide verse that is compatible with one to three syllable words or phrases (as applicable), with gender selected by the system or provided by the operator. Of course, it will be understood that with some more complexity in the program, more characteristics could be provided and more selections could be made by the operator. The maximum number of syllables in a word or phrase could be in creased and the number of verses could be changed. In other configurations of the invention, one would not be limited to the limerick format nor necessarily, to poetic output.

ANTICIPATED ENHANCEMENTS

In future enhancements of the software, the data base will be increased to prevent duplication of outputted verses upon successive input of identical variables by the operator, see supra. Some of the codes already have as many as six different verses available from the present data base. It should be understood that many more than that could be implemented. It is further planned to provide a sensor to indicate to the system whether the operator represents a singular or plural sender. It will also be clear that the poetry could be addressed to more than one person. This information will be used to change the first person pronouns in the outputted poetry to the plural form, where applicable. A still further enhancement which is planned is to provide drawings in the computer output for inclusion with the poetry. For example, a "you owe me money" message might be accompanied by a drawing of an outstretched hand. A wedding message or occasion might be accompanied by a drawing of a wedding couple or flowers. It is expected that these graphic outputs will be accomplished by means of the plotter option mentioned, supra, but of course, it would be possible to provide such drawings on an output printer as well.

It is also anticipated that the computer will be programmed to output audible musical notes which are related to messages and traits which are selected by the operator and/or output some or all of the queries and-/or the poetry in synthesized speech form.

SYLLABLE COUNT ALGORITHM

There are two places in the flow chart of FIG. 2 (as described above) where it is necessary for the system of the invention to recognize the number of syllables in an input word or phrase. The algorithm which is utilized to perform that function is set forth here in logical detail (the actual implementation may be seen by reviewing the source code for the program, see Appendix):

1. Definition: A vowel is "a", "e", "i", "o", "u" and "y", except where "y" is the first letter of a word.
2. Set syllable count to zero.
3. If the number of characters is less than seven and all letters are capitalized, then the syllable count is equal to the number of capital letters and all other calculations of the algorithm are skipped over.
4. Test each letter of the word(s) in succession from left to right:

(a) If the letter is a vowel, add one to the syllable count.
(b) If the letter is an "e" and the next character is a space, subtract 1 from the syllable count.
(c) If the letter is an "e", the next character is a space and the two preceding letters are consonants, then add 1 to the syllable count.
(d) If the letter is an "e" and the next letter is an "s" and is also the last letter of the word, subtract 1 from the syllable count.
(e) If the letter is an "e" and the next letter is an "s" and is also the last letter of the word, and the two preceding letters were consonants, then add 1 to the syllable count.
(f) If the letter is an "o" and is preceded by an "i" or an "e", then add 1 to the syllable count.
(g) If the letter is an "a" and is preceded by an "i", add 1 to the syllable count.
(h) If neither (c), (d), (e), (f) or (g) applies and the preceding character is a vowel and the second preceding character is a consonant (or there is no second preceding character), then add 1 to the syllable count.
5. Any syllable count over 3 is set to 3.
6. Any syllable count less than 1 is set to 1.

This concludes the description of the preferred syllable count algorithm of the invention. The algorithm is used to select introduction, trait, and message or occasion verses from respective data bases which are compatible with the number of syllables in the input word(s) for the purpose of maintaining reasonable poetic meter in the output product of the invention.

The formatted printed listing, as shown in blocks 310, 324 and 328 of FIG. 4, and as available at the time of filing of the instant patent application, are set forth in the Appendix.

While the invention has been particularly shown and described with reference to a preferred embodiment thereof, it will be understood by one having ordinary skill in the art that various other modifications and changes may be made to the present invention from the principles of the invention described herein without departing from the spirit and scope thereof, as encompassed in the accompanying claims. Therefore, it is intended in the appended claims to cover all such equivalent variations which do essentially the same thing in essentially the same way to produce the same result which come within the scope of the invention as described.

What is claimed:

1. A method for using a computer for producing pseudorandom output text respnsive to a plurality of input data set items, provided by an operator to the computer, according to the following steps:

inputting a plurality of text blocks as a data base for the computer, each of said plurality of text blocks being identified as one of a plurality of characterizations;

querying the operator for the plurality of input data set items, all of the plurality of input data set items being related to a single intended recipient of the pseudorandom output text, said at least single intended recipient being predetermined by and identified to the computer by the operator;

producing a different portion of the pseudorandom output text in response to each of the plurality of input data set items, said responsive output portions being related to each of the plurality of input data set items by means of said plurality of characterizations, each of said responsive output portions being selected sequentially from a plurality of said responsive related output portions; and outputting the pseudorandom output text to a plotter.

2. The method according to claim 1 wherein each of said plurality of text blocks taken in combination demonstrate a rhyme and meter characteristic of poetic verse.

3. The method according to claim 2 wherein the plurality of input data items comprise a name identification and means for determining a gender associated with said name identification, a place of residence identification, and at least one of at least a first and second personal trait identification and at least one of an occasion and a message identification.

4. The method according to claim 3 wherein said plurality of characterizations comprise a characterization of a plurality of verses as trait verses.

5. The method according to claim 4 wherein said plurality of characterizations comprise a characterization of a plurality of verses as introductory verses.

6. The method according to claim 3 wherein said plurality of characterizations comprise a characterization of a plurality of verses as introductory verses.

7. The method according to claim 4 wherein a selection of at least a portion of said verses is made according to the number of syllables in at least one of the plurality of input data set items.

8. The method according to claim 5 wherein a selection of at least a portion of said verses is made according to the number of syllables in at least one of the plurality of input data set items.

9. The method according to claim 6 wherein a selection of at least a portion of said verses is made according to the number of syllables in at least one of the plurality of input data set items.

10. The method according to claim 1 wherein said computer further comprises a plotter, said plotter being electrically connected to an output port of said computer for recording said output of said computer on said plotter.

11. The method according to claim 2 wherein said computer further comprises a plotter, said plotter being electrically connected to an output port of said computer for recording said output of said computer on said plotter.

12. The method according to claim 3 wherein said computer further comprises a plotter, said plotter being electrically connected to an output port of said computer for recording said output of said computer on said plotter.

13. The method according to claim 4 wherein said computer further comprises a plotter, said plotter being electrically connected to an output port of said computer for recording said output of said computer on said plotter.

14. The method according to claim 5 wherein said computer further comprises a plotter, said plotter being electrically connected to an output port of said computer for recording said output of said computer on said plotter.

15. The method according to claim 6 wherein said computer further comprises a plotter, said plotter being electrically connected to an output port of said computer for recording said output of said computer on said plotter.

16. The method according to claim 7 wherein said computer further comprises a plotter, said plotter being electrically connected to an output port of said computer for recording said output of said computer on said plotter.

17. The method according to claim 8 wherein said computer further comprises a plotter, said plotter being electrically connected to an output port of said computer for recording said output of said computer on said plotter.

18. The method according to claim 9 wherein said computer further comprises a plotter, said plotter being electrically connected to an output port of said computer for recording said output of said computer on said plotter.

19. Apparatus comprising a computer for producing pseudorandom output text responsive to a plurality of input data set items provided by an operator to the computer, the apparatus comprising:
means for computing;
means for inputting a plurality of text blocks as a data for said means for computing, each of said plurality of text blocks being identified as one of a plurality of characterizations;
means for querying the operator for the plurality of input data set items, all of the plurality of input data set items being related to a single intended recipient of the pseudorandom output text, said at least single intended recipient being predetermined by and identified to the computer by the operator; and
means for producing a different portion of the pseudorandom output text in response to each of the plurality of input data set items, said responsive output portions being related to each of the plurality of input data set items by means of said plurality of characterizations, each of said responsive output portions being selected sequentially from a plurality of said responsive related output portions; and
means for outputting the pseudorandom output text to a plotter.

20. The apparatus according to claim 19 wherein each of said plurality of text blocks taken in combination demonstrate a rhyme and meter characterister of poetic verse.

21. The apparatus according to claim 20 wherein the plurality of input data set items comprises a name identification and means for determining a gender associated with said name indentification, a place of residence identification, and at least one of at least a first and second personal trait identification and at least one of an occasion and message identification.

22. The apparatus according to claim 21 wherein said plurality of characterizations comprises a characterization of a plurality of verses as trait verses.

23. The apparatus according to claim 22 wherein said plurality of characterizations comprise a characterization of a plurality of verses as introductory verses.

24. The apparatus according to claim 21 wherein said plurality of characterizations comprise a characterization of a plurality of verses as introductory verses.

25. The apparatus according to claim 22 wherein a selection of at least a portion of said verses is made according to the number of syllables in at least one of the plurality of input data set items.

26. The apparatus according to claim 23 wherein a selection of at least a portion of said verses is made according to the number of syllables in at least one of the plurality of input data set items.

27. The apparatus according to claim 24 wherein a selection of at least a portion of said verses is made according to the number of syllables in at least one of the plurality of input data set items.

28. The apparatus according to claim 19 wherein said means for computing further comprises:
means for plotting, said means for plotting being connected electrically to an output port of said means for computing and said output text being outputted via said output port to said means for plotting.

29. The apparatus according to claim 20 wherein said means for computing further comprises:
means for plotting, said means for plotting being connected electrically to an output port of said means for computing and said output text being outputted via said output port to said means for plotting.

30. The apparatus according to claim 21 wherein said means for computing further comprises:
means for plotting, said means for plotting being connected electrically to an output port of said means for computing and said output text being outputted via said output port to said means for plotting.

31. The apparatus according to claim 22 wherein said means for computing further comprises: means for plotting, said means for plotting being connected electrically to an output port of said means for computing and said output text being outputted via said output port to said means for plotting.

32. The apparatus according to claim 23 wherein said means for computing further comprises:
means for plotting, said means for plotting being connected electrically to an output port of said means for computing and said output text being outputted via said output port to said means for plotting.

33. The apparatus according to claim 24 wherein said means for computing further comprises:
means for plotting, said means for plotting being connected electrically to an output port of said means for computing and said output text being outputted via said output port to said means for plotting.

34. The apparatus according to claim 25 wherein said means for computing further comprises:
means for plotting, said means for plotting being connected electrically to an output port of said means for computing and said output text being outputted via said output port to said means for plotting.

35. The apparatus according to claim 26 wherein said means for computing further comprises:
   means for plotting, said means for plotting being connected electrically to an output port of said means for computing and said output text being outputted via said output port to said means for plotting.

36. The apparatus according to claim 27 wherein said means for computing further comprises:
   means for plotting, said means for plotting being connected electrically to an output port of said means for computing and said output text being outputted via said output port to said means for plotting.

* * * * *